United States Patent
Gill et al.

(10) Patent No.: US 6,373,914 B1
(45) Date of Patent: Apr. 16, 2002

(54) IN-SITU TEST PROBE FOR REACTOR TUBE RIB PLUGS

(75) Inventors: Chad E. Gill, Lynchburg; Mark A. Klahn, Forest, both of VA (US)

(73) Assignee: Framatome ANP, Inc., Lynchburg, VA (US)

( * ) Notice: Subject to any disclaimer, the term of this patent is extended or adjusted under 35 U.S.C. 154(b) by 0 days.

(21) Appl. No.: 09/610,407

(22) Filed: Jul. 5, 2000

(51) Int. Cl.[7] .............................................. G21C 17/00
(52) U.S. Cl. ........................... 376/245; 376/203; 73/46
(58) Field of Search .................................. 376/250, 247, 376/245, 260, 203; 165/11.1; 73/46, 49.8; 138/90

(56) References Cited

U.S. PATENT DOCUMENTS

| | | | | |
|---|---|---|---|---|
| 4,275,414 A | * | 6/1981 | Norris ........................ | 358/100 |
| 4,385,643 A | * | 5/1983 | Noe ............................ | 138/90 |
| 4,770,029 A | * | 9/1988 | Webber et al. ............... | 73/46 |
| 4,856,337 A | * | 8/1989 | Metala et al. ................ | 73/46 |
| 5,017,329 A | * | 5/1991 | Vermaat ...................... | 576/249 |
| 5,025,215 A | * | 6/1991 | Pirl ............................. | 324/220 |
| 5,100,610 A | * | 3/1992 | Pirl et al. .................... | 376/260 |
| 5,182,076 A | * | 1/1993 | de Seroux et al. .......... | 376/203 |

* cited by examiner

*Primary Examiner*—Charles T. Jordan
*Assistant Examiner*—Judith A. Nelson
(74) *Attorney, Agent, or Firm*—Vytas R. Matas

(57) ABSTRACT

An in-situ testing apparatus for testing the integrity of rib plugs used to seal faulty reactor boiler tubes consists of a cup-shaped member with a groove on the open end, a tapped hole for attaching a hydraulic hose of known pressure, and a hole through the top of the member. A seal is installed in the groove on the open end of the cup to seal to the primary face of a tubesheet around the tested rib plug. A threaded mandrel goes through the hole in the top of the cup-shaped member and engages the expander member of the rib plug. The threading action of the mandrel into the expander draws the seal against the tubesheet to seal the testing apparatus and allows the rib plug to be in-situ pressure tested.

6 Claims, 2 Drawing Sheets

PRIOR ART

IN-SITU TEST PROBE FOR REACTOR TUBE RIB PLUGS

BACKGROUND OF THE INVENTION

1. FIELD OF THE INVENTION

The present invention is generally drawn to reactor tube rib plugs and more particularly to a testing assembly for testing the tube sealing integrity of same.

2. DESCRIPTION OF THE PRIOR ART

In tube-type heat exchangers, a first fluid flows through the tubes of the heat exchanger while a second fluid surrounds the outside of the tubes such that heat exchange occurs between the two fluids. One or more of the tubes can become defective over the life of the heat exchanger such that a leak occurs which allows the two fluids to mingle. When this occurs, it is necessary to plug the tube so that the fluid does not flow through the tube thereby preventing the leakage of the first fluid to the other fluid.

In nuclear reactor power plants, when such a defect occurs in the tubes of a nuclear steam generator the coolant in the tubes is allowed to mingle with the coolant outside of the tubes and a more significant problem arises. A radioactive contamination problem occurs. Since the fluid flowing in the tubes of a nuclear steam generator is generally radioactive, it is important that it not be allowed to leak from the tubes and contaminate the fluid surrounding the tubes. Therefore, when a leak occurs in a nuclear steam generator heat exchange tube, the heat exchange tube is plugged so that the coolant is not permitted to flow through the tube.

One type of tube plug used for the above application is described in U.S. Pat. No. 4,390,042, which patent is incorporated herein by reference thereto. This plug as best seen in FIG. 1 comprises a shell having a tapered inner surface against which an externally tapered expander member moves by application of a pulling force. The motion of the expander member relative to the shell causes the shell to expand into contact with a heat exchange tube thereby plugging the tube. The expander member is formed from a hardened metal with tangentially blended leading radius and a self-locking trailing edge, which provides for ease in expanding the shell while preventing inadvertent unlocking of the plug. The shell has a substantially uniform wall thickness throughout the portion of the shell which experiences expansion so that the force necessary to perform the expanding process does not increase beyond strength limitations of installation equipment as the expander member is moved through the shell. The shell also has a plurality of lands on the outside surface thereof whose depth increases from closed end to open end of the shell so that a substantially uniform wall thickness can be maintained in that region while allowing the lands to contact the inner surface of the heat exchange tube.

The described plug and its position sealing a faulty reactor stem generator tube is best seen in FIG. 2.

However, under certain circumstances these tube plugs may themselves leak either from a faulty installation or from wear over time. Hence, a simple and easy to use testing apparatus was needed to determine the sealing integrity of these tube plugs since it is known that at least one nuclear reactor plant had to come "off line" unexpectedly due to primary to secondary leakage beyond allowable limits from the described ribbed tube plugs.

Complex and hard to use integrity testing apparatus are known for testing such ribbed tube plugs. One such system is described in U.S. Pat. No. 5,100,610. This inspection system utilizes an eddy current detector that is rotated to inspect the tube plug. This system is complicated and expensive. There is no teaching in the prior art of a simple, easy to use testing apparatus that uses water injection to pressure test the integrity of the tube plug.

SUMMARY OF THE INVENTION

The present invention is drawn to an in-situ pressure testing apparatus for testing the integrity of a rib type seal on a faulty nuclear reactor tube. The apparatus uses a cup-shaped member that seals on the face of the tubesheet containing the faulty tube sealed with the rib plug. The seal is affected by a tubular member of the testing apparatus which sealably extends through the cup-shaped member and which has a mandrel at the end thereof which is threaded into the expander member of the rib plug. When the testing appararus is thus sealed to the tubesheet, pressurized water is admitted to the inside of the testing apparatus and to the rib plug covered by the testing apparatus. The pressurized water is passed through an aperture in the tubular member and through the mandrel into the interior of the rib plug inside the expander member to thus test the integrity of the rib plug seal on both sides of the expander member.

In view of the foregoing it is seen that one aspect of the present invention is to provide a seal integrity testing apparatus for boiler tube seal plugs.

Another aspect of the present invention is to provide a seal integrity testing apparatus for ribbed tube seals used to plug defective boiler tubes in nuclear reactors.

These and other aspects will be more fully understood upon a review of the following description of the preferred embodiment when considered with the accompanying drawings.

DESCRIPTION OF THE PREFERRED EMBODIMENT

Figure 1:
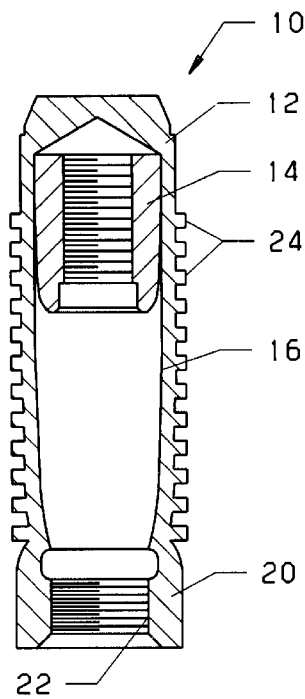
FIG. 1 is a cross sectional view of a prior art ribbed tube plug.

Referring now to the drawings generally and to to FIG. 1 in particular, the prior art tube plug (10) comprises a shell (12) and an expander member (14) The shell (12) is a substantially cylindrical member manufactured from a metal such as Inconel. Shell (12) has a conical inner surface (16) that has a larger diameter at the closed end (18) and a smaller diameter at the open end (20). The inner surface (16) is arranged such that expander member (14) is captured within the shell (12) so that movement of the expander member (14) relative to inner surface (16) causes shell (12) to expand without allowing the expander member (14) to be removed from the shell (12). The shell (12) also has a threaded bore (22) near open end (20) which has a diameter larger than the smallest diameter of inner surface (16) which allows the apparatus to be inserted through the hreaded bore (22) and into the interior of shell (12) which also has a substantially uniform wall thickness in the portion of shell (12) that is expanded by expander member (14). In addition, a plurality of lands (24) are formed on the outside surface of the shell (12) in a manner such that the height of each land (24) increases from the closed end (18) to the open end (20) while the outer surfaces of all the lands (24) is maintained at approximately the same external diameter and while the wall thickness of shell (12) remains substantially constant throughout the portion of shell (12) wherein the lands (24) are located.

Figure 2:
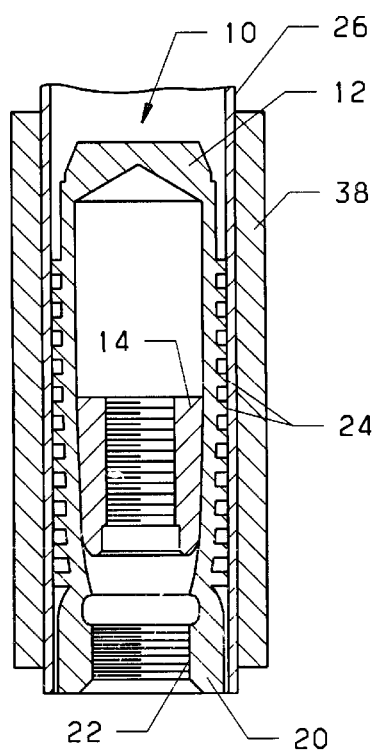
FIG. 2 is a prior art cross-sectional view in elevation of the tube plug in a heat exchanger tube in the expanded position.

As shown in FIG. 2, the relative movement of expander member (14) with respect to inner surface (16) causes the shell (12) to expand until the lands (24) contact the heat exchange tube (26). As the expander member (14) is moved relative to the shell (12) the metal in the wall of shell (12) tends to flow around the expander member (14) such that inadvertent backward motion of the expander member (14) is lessened. This provides a self-locking feature. Once tube plug (10) has been expanded, the tube plug (10) is in the locked position as shown in FIG. 2.

When in this locked position, a plurality of lands (24) are impressed in the wall of heat exchange tube (26). The lands (24) thereby establish a type of labyrinth seal along the inner surface of the heat exchange tube (26) which prevents fluid from flowing therethrough. Moreover, since the shell (12) has a closed end (18) there is no potential leak path through the tube plug (10).

Figure 3:
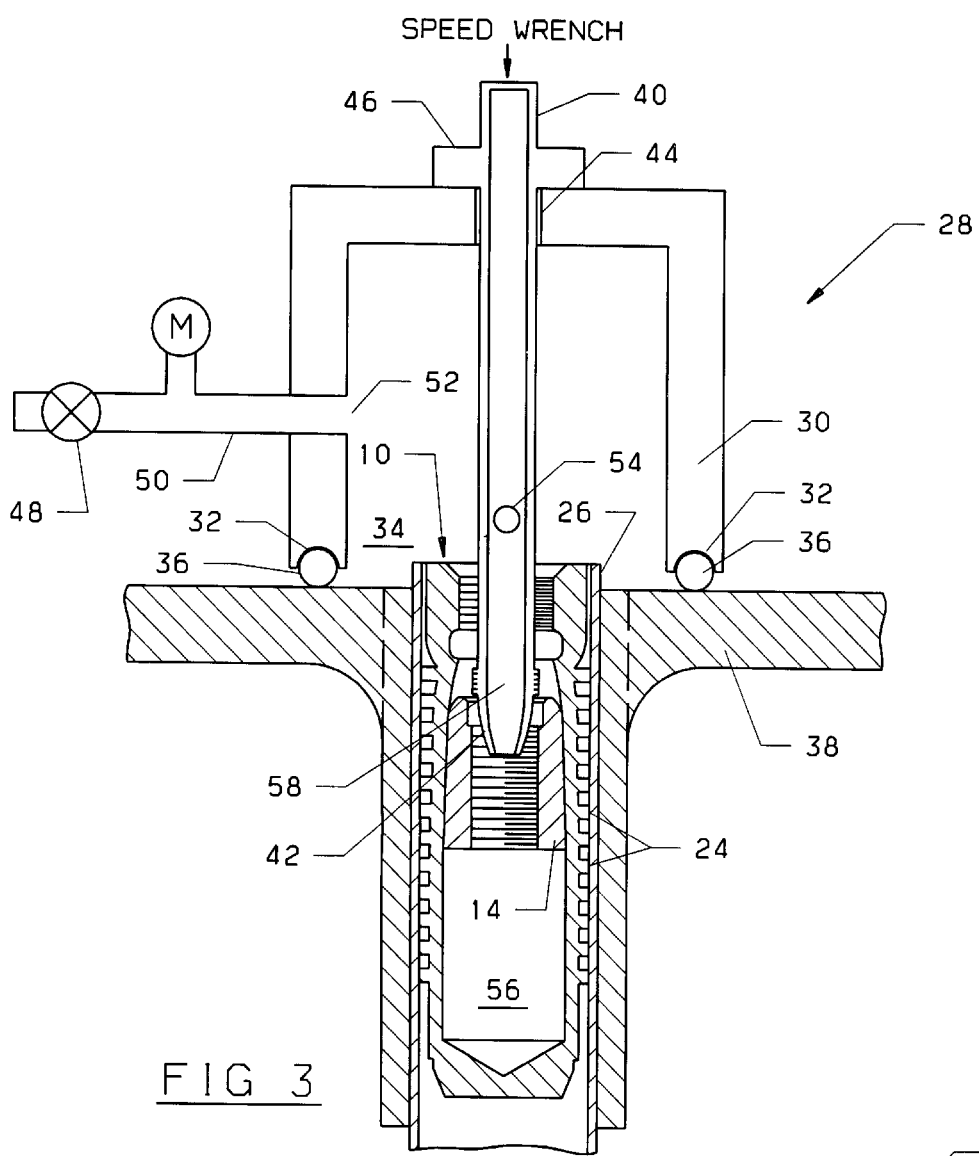
FIG. 3 is a cross-sectional view of the testing apparatus of the present invention mounted to the FIG. 2 installed tube plug.
Figure 4:
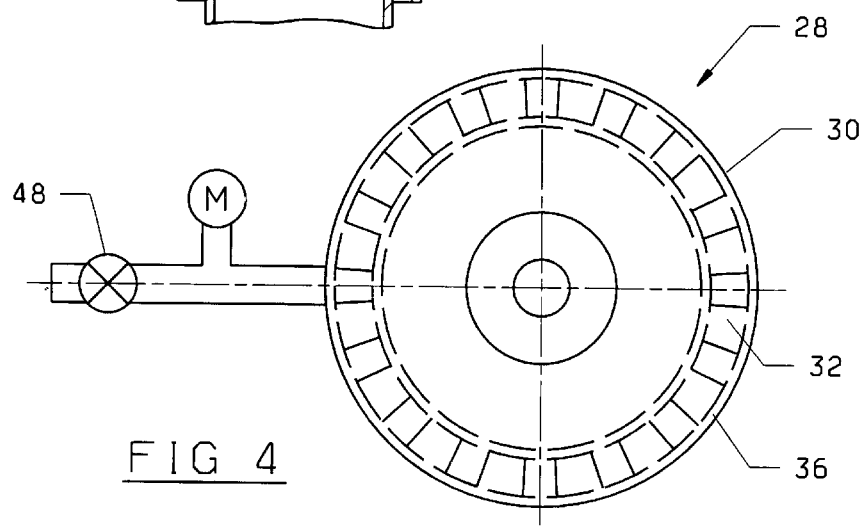
FIG. 4 is a top view of the FIG. 3 testing apparatus.

Turning next to FIGS. 3 and 4, a ribbed plug integrity testing apparatus (28) is seen to be comprised of a cup-shaped member (30) having a groove (32) at an open end (34) of the member (30) into which is fitted a circular O-ring seal (36). The member (30) is fitted over the ribbed seal plug (10) with the open end (34) of the member (30) resting against the primary face of a tube sheet (38) through which the tube (26) and plug (10) sealably extend.

An anchoring rod or member (40) having an end located mandrel (42) is rotatably mounted through a seal (44) into the closed top (46) of the member (30). The mandrel (42) is flexible and is threaded to be complimentary to the internal threads of the expander member (14). Thus, ehen a speed wrench (not shown) which is connected to the anchoring rod (40) turns the attached mandrel (42) into the expander member (14), the anchoring rod is driven down against the saucer-shaped member (30) by the enlarged rod head portion (46) located above the cup-shaped member. The threading action of the mandrel (42) into the expanding member (14) thus draws the o-ring seal (36) against the tube sheet (38). Once this o-ring seal is sufficiently pressed against the tubesheet, the testing apparatus is sealed and the ribbed plug (10) can be in-situ pressure tested.

The test is performed by opening a valve (48) which is normally closed and which transports a known high-pressure fluid in line (50) to the testing apparatus (28) through an aperture (52). The known pressure fluid enters the testing apparatus and is transmitted to the inside of the plug (10) above the mandrel (42) which is now in a position sealing the expander member (14). An aperture (54) located in the hollow anchoring rod (40) transmits the known pressure fluid to the bottom (56) of the plug (10) below the member (14) through an opening (58) in the mandrel (42). The pressure of the fluid in the entire plug (10) and in the testing apparatus (28) is monitored by a meter (58) located in line (50) downstream of the valve (48). The valve (48) is again closed, and if the meter indicates the pressure is stable at the known line pressure P the plug (10) is then shown free of defects. If the pressure begins to fall below the known line pressure then it is seen that the plug (10) is leaking and is faulty and must be replaced.

Certain additions and modifications to the present disclosure generally and the testing apparatus in particular have been deleted herein for the sake of conciseness and readability but are considered to fall within the scope of the following claims. As an example, there are multiple variations to the design that could be made and still accomplish some or all of the goals of this invention. As described, the testing apparatus rod and mandrel threads into and pulls on the expander member of the ribbed plug. This arrangement could easily change with different types of plugs and conditions. It is possible to thread the rod directly into the head of the plug rather than using the mandrel. Likewise, the seal could be made against the head of the plug instead of on the face of the tubesheet. This would not test all the available leak paths but would check the integrity of the plug itself. Also, the testing apparatus uses the rotation of a threaded rod to apply the force necessary to create the face seal. This seal could also be accomplished by locking into the plug and hydraulically compressing the seal.

What is claimed is:

1. A sealing integrity testing apparatus for detecting a defective boiler tube plug comprising:

a cylindrical plug sealably locatable within a boiler tube for sealing flow through the boiler tube;

a test monitor located around said cylindrical plug and said boiler tube to provide a sealed space for said plug and said tube;

means for pressurizing said sealed space to a known pressure; and a pressure monitor connected to said space to measure the pressure therein to determine any pressure drop as an indication of a defective boiler tube plug.

2. An apparatus as set forth in claim 1 wherein said test member comprises a cup shaped member having a O-ring seal along the open end thereof to seal said test member against a surface around said plug and said tube.

3. An apparatus as set forth in claim 2 wherein said plug is a ribbed plug having an internally threaded extender member therein for pressing the ribs of said ribbed member against said tube to seal said tube thereby.

4. An apparatus as set forth in claim 3 wherein said test member includes a hollow tubular member sealably extending through said cup shaped member and having a threaded mandrel at the end hereof for screwing into said extender member of said ribbed plug to seal said test member to said plug and said tube.

5. An apparatus as set forth in claim 4 wherein said hollow tubular member has an aperture therein for communicating a fluid pressure in said test member to said ribbed plug area below said expanding member.

6. An apparatus as set forth in claim 5 wherein said boiler tube is located inside a nuclear reactor.

* * * * *